United States Patent
Kalluri

(10) Patent No.: US 11,775,759 B2
(45) Date of Patent: *Oct. 3, 2023

(54) SYSTEMS AND METHODS FOR TRAINING AND EVALUATING MACHINE LEARNING MODELS USING GENERALIZED VOCABULARY TOKENS FOR DOCUMENT PROCESSING

(71) Applicant: Oracle International Corporation, Redwood Shores, CA (US)

(72) Inventor: Sudhakar Kalluri, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,178

(22) Filed: Aug. 15, 2022

(65) Prior Publication Data

US 2022/0391589 A1 Dec. 8, 2022

Related U.S. Application Data

(63) Continuation of application No. 16/678,280, filed on Nov. 8, 2019, now Pat. No. 11,481,554.

(51) Int. Cl.
*G06F 40/284* (2020.01)
*G06N 20/00* (2019.01)
(Continued)

(52) U.S. Cl.
CPC .......... *G06F 40/284* (2020.01); *G06F 40/279* (2020.01); *G06F 40/30* (2020.01); *G06N 20/00* (2019.01)

(58) Field of Classification Search
None
See application file for complete search history.

(56) References Cited

U.S. PATENT DOCUMENTS 9,037,464 B1 5/2015 Mikolov et al.
9,483,740 B1 11/2016 Ansel et al.
(Continued)

OTHER PUBLICATIONS

Kalra, Vandana, Indu Kashyap, and Harmeet Kaur. "Improving document classification using domain-specific vocabulary: hybridization of deep learning approach with TFIDF." International Journal of Information Technology (2022): 1-7. (Year: 2022).
(Continued)

*Primary Examiner* — Antim G Shah
(74) *Attorney, Agent, or Firm* — Invoke

(57) ABSTRACT

Techniques are described herein for training and evaluating machine learning (ML) models for document processing computing applications using generalized vocabulary tokens. In some embodiments, an ML system determines a set of tokens for non-textual content in a plurality of documents. The ML system generates a fixed-length vocabulary that includes the set of tokens for the non-textual content. The ML system further generates for each respective document in a training dataset of documents, a respective feature vector based at least in part on which tokens in the fixed-length vocabulary occur in the respective document. The ML system trains a ML model based at least in part on the respective feature vector for each respective document in the training dataset.

20 Claims, 8 Drawing Sheets

(51) Int. Cl.
   *G06F 40/279*        (2020.01)
   *G06F 40/30*         (2020.01)

(56) References Cited

U.S. PATENT DOCUMENTS

| | | | |
|---|---|---|---|
| 10,380,498 | B1 | 8/2019 | Chaoji et al. |
| 11,120,364 | B1* | 9/2021 | Gokalp ................. G06N 20/00 |
| 11,222,031 | B1 | 1/2022 | Mohandas |
| 11,481,554 | B2* | 10/2022 | Kalluri .................... G06F 40/30 |
| 2003/0074368 | A1* | 4/2003 | Schuetze ............ G06F 16/5846 |
| | | | 707/E17.022 |
| 2006/0253273 | A1 | 11/2006 | Feldman et al. |
| 2014/0365207 | A1 | 12/2014 | Convertino et al. |
| 2015/0178268 | A1 | 6/2015 | Zuev et al. |
| 2015/0178269 | A1 | 6/2015 | Zuev et al. |
| 2017/0250931 | A1 | 8/2017 | Ioannou et al. |
| 2018/0114142 | A1 | 4/2018 | Mueller |
| 2018/0173696 | A1 | 6/2018 | Hosabettu |
| 2019/0080627 | A1 | 3/2019 | Dey et al. |
| 2019/0349399 | A1 | 11/2019 | Liu et al. |
| 2019/0377785 | A1 | 12/2019 | N et al. |
| 2020/0026755 | A1 | 1/2020 | Hewitt et al. |
| 2020/0167429 | A1 | 5/2020 | Katz et al. |
| 2020/0401658 | A1 | 12/2020 | Katz et al. |
| 2021/0012102 | A1* | 1/2021 | Cristescu ............. G06V 30/412 |
| 2021/0056164 | A1* | 2/2021 | Mustafi ................ G06V 30/416 |
| 2021/0089570 | A1* | 3/2021 | Hunter ............... G06Q 10/1053 |

OTHER PUBLICATIONS

Saputra, Dimas Gilang, and Masayu Leylia Khodray. "An ensemble approach to handle out of vocabulary in multilabel document classification." 2016 International Conference On Advanced Informatics: Concepts, Theory And Application (ICAICTA). IEEE, 2016. (Year: 2016).

* cited by examiner

SYSTEMS AND METHODS FOR TRAINING AND EVALUATING MACHINE LEARNING MODELS USING GENERALIZED VOCABULARY TOKENS FOR DOCUMENT PROCESSING

INCORPORATION BY REFERENCE; DISCLAIMER

Each of the following applications are hereby incorporated by reference: application Ser. No. 16/678,280 filed on Nov. 8, 2019; application Ser. No. 16/524,440 filed on Jul. 29, 2019. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to machine learning systems and applications. In particular, the present disclosure relates to training, tuning, and evaluating machine learning models based on vocabularies constructed from documents in a document corpus.

BACKGROUND

Machine learning involves techniques through which computing systems make inferences and adjustments during runtime rather than relying on static instruction sets to perform tasks. Machine learning has a wide range of applications, such as tuning search engine results, diagnosing medical conditions, recognizing images, recommending relevant items, forecasting resource utilization, responding to natural language inputs through virtual assistants, and improving autonomous driving vehicles, among several others.

In many applications, a training corpus of text documents is processed to develop a machine learning (ML) algorithm or model to be applied on a new document. For example, the corpus of documents may include Tweets, and the ML model may be developed to classify the sentiments of new tweets as positive or negative. The process of developing the ML model typically comprises fitting model parameters to learned patterns from the training corpus of documents. The process that is used to develop the ML model may impact various aspects of an application, such as the compute resources and processing time needed to train the ML model, the accuracy of the ML model, and the usability of the application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
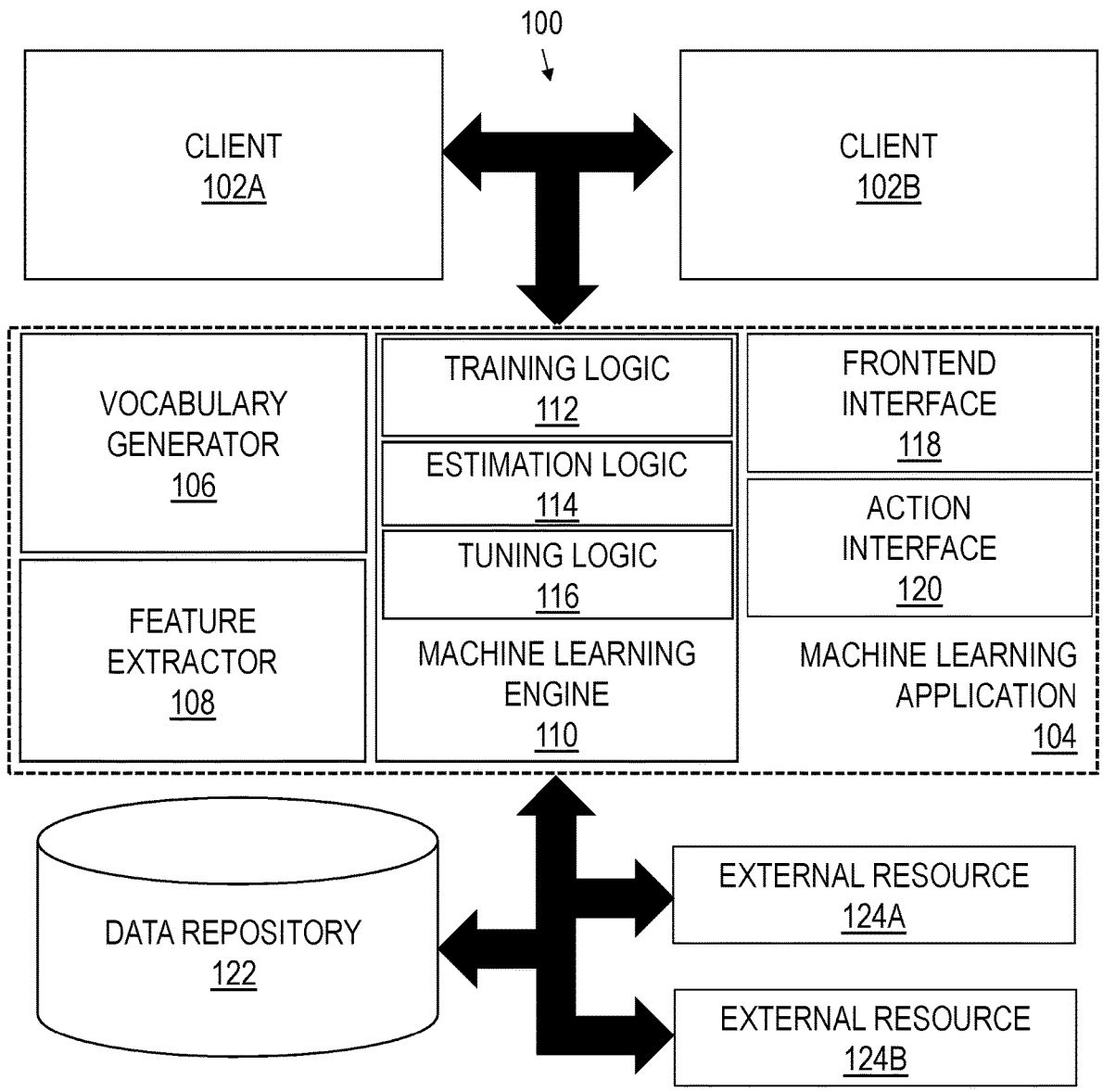
FIG. 1 illustrates an example system for constructing vocabularies for use in machine-learning applications in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
   2.0 SYSTEM ARCHITECTURE
   3.0 GENERALIZED VOCABULARIES FOR DOCUMENT PROCESSING
      3.1 VOCABULARY CONSTRUCTION FOR VARYING CONTENT TYPES
      3.2 VOCABULARY TOKEN WEIGHTING
      3.3 VOCABULARY-BASED REPRESENTATIONS OF DOCUMENTS
   4.0 MACHINE-LEARNING OPTIMIZATIONS AND APPLICATIONS
      4.1 PROCESS OVERVIEW 4.2 MODEL TRAINING BASED ON GENERALIZED VOCABULARIES
      4.3 MODEL PREDICTIONS USING GENERALIZED VOCABULARIES
      4.4 MODEL TUNING
   5.0 COMPUTER NETWORKS AND CLOUD NETWORKS
   6.0 MICROSERVICE APPLICATIONS
   7.0 HARDWARE OVERVIEW
   8.0 MISCELLANEOUS; EXTENSIONS

1.0 GENERAL OVERVIEW

Techniques are described herein for training and evaluating machine learning (ML) models for document processing computing applications using generalized vocabulary tokens. A vocabulary in this context refers to a set of tokens that are present in a corpus of documents. In some embodiments, a vocabulary may include tokens for textual content included in an electronic document. For text-based content, a token may be a single word, referred to as a unigram, a phrase of two consecutive words, referred to as a bigram, or a phrase of n or more consecutive words, referred to as an n-gram.

In addition or as an alternative to vocabularies for text-based content, the techniques further provide for constructing vocabularies for non-textual content. Example non-textual content may include, but is not limited to, images, videos, and hyperlinks. A fixed-length, generalized vocabulary may be constructed from a training corpus of electronic documents when dealing with a finite set of possibilities for the image, videos, web-links and/or other non-textual content included therein.

In some embodiments, a token in a non-textual vocabulary corresponds to non-textual content that was detected within a training corpus of documents. For example, an image token may uniquely identify an image detected in one or more documents, a video token may uniquely identify a video detected in one or more documents, and a hyperlink token may uniquely identify a hyperlink detected in one or more documents. Additionally or alternatively, a token in a non-textual vocabulary may correspond to a category, such as an image category, video category, or hyperlink category. The vocabulary may further be constructed from other attributes of non-textual content that have a finite set of values.

In some embodiments, the vocabularies for non-textual content are used to train and tune ML models. An electronic document may be transformed into an ML feature vector based at least in part on occurrence of vocabulary tokens in a training corpus of documents. The ML feature vectors may be constructed with relatively low processing overhead, as the occurrence of vocabulary tokens may be quickly computed. An occurrence may be determined by computing a count or frequency with which the token occurs in the training corpus. The techniques do not require compute-intensive image and video processing tasks, such as matrix transformations. Thus, the techniques may allow for better optimizations of ML applications on platforms with limited resources and in applications that involve data streaming.

In some embodiments, an ML training process receives a set of labeled training documents, where each electronic document is associated with a label. A label in this context may refer to a metric or classification for the document. For example, a set of Tweets may be classified as positive, negative, or neutral in sentiment. As another example, a set of videos may be flagged for copyright infringement or unflagged. In yet another example, a hyperlink may have a label identifying the click-through rate for visitors to a webpage in which the hyperlink is embedded. Other labels may also be assigned, depending on the particular implementation. The ML training process may generate, based at least in part on a constructed vocabulary, feature vectors for each document in the training corpus. The ML training process may then use the feature vectors and associated labels to train one or more ML models, such as regression-based models, artificial neural networks, and support vector machines.

In some embodiments, features within an ML feature vector may span vocabularies for different content types. For example, an ML feature vector for a document may be generated based at least in part on which image tokens, video tokens, hyperlink tokens, and/or textual tokens (from their corresponding vocabularies) occur within the document. One approach for generating the ML feature vector is to concatenate vocabularies for the different types of contents into a single vocabulary that includes tokens for different content types. Another approach is to generate a feature vector for each vocabulary. The set of feature vectors may then be concatenated to form the ML feature vector for an example.

In some embodiments, the techniques include tuning an ML model by adjusting one or more parameters associated with a vocabulary. For example, the tuning process may train a plurality of ML models using different vocabularies by varying the set of tokens and/or token weights. The tuning process may compute the estimation error for each model over a test set of examples and select the model with the lowest estimation error.

In some embodiments, the techniques include evaluating new examples using the trained ML model. A trained ML model may be used to estimate a label for the new example. The labels that are estimated may vary depending on the particular implementation. For example, an ML model may be used to estimate a sentiment of a social media post including a given image or set of images. As another example, an ML model may be used to automatically flag videos on a video-sharing platform that are likely to infringe a copyright. In yet another example, an ML model may estimate a predicted click-through rate for a hyperlink embedded in a webpage. Other ML applications may similarly leverage the techniques described herein to estimate other labels, which may vary from implementation to implementation. The ML applications may execute one or more application-specific actions based on the labels.

One or more embodiments described in this Specification and/or recited in the claims may not be included in this General Overview section.

2.0 SYSTEM ARCHITECTURE

FIG. 1 illustrates an example system for constructing vocabularies for use in machine-learning applications in accordance with some embodiments. As illustrated in FIG. 1, system 100 includes clients 102a-b, ML application 104, data repository 122, and external resources 124a-b. System 100 and ML application 104 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, ML application 104 provides components through which inferences and adjustments may be automatically made during application runtime rather than relying on static instruction sets to perform tasks. The components may include vocabulary generator 106, feature extractor 108, ML engine 110, frontend interface 118, and action interface 120. However, as previously indicated the components of system 100, including ML application 104 may vary depending on the particular implementation.

In some embodiments, vocabulary generator 106 receives a set of electronic documents as input and automatically constructs a vocabulary based on extracted tokens. An electronic document in this context may include any electronic media content. Examples include, but are not limited to, webpages, Tweets and other social media posts, emails, spreadsheets, word processing files, video files, and image files. Vocabulary generator 106 may be configured to process documents that conform to varying file formats and encodings. For example, webpages may be encoded according to one or more versions of hypertext markup language (HTML), extensible markup language (XML), Cascading Style Sheets (CSS), JavaScript, and/or other programming languages. A token may be a data object that uniquely identifies media content within an electronic document, such as words, images, videos, and/or hyperlinks. In some embodiments, a token uniquely identifies a single content item, such as an individual word, image, video, or hyperlink. Tokens representing individual items are referred to herein as unigrams. Additionally or alternatively, a vocabulary may include tokens that uniquely identify a sequence of content items. Tokens representing multiple items are referred to herein as n-grams.

In some embodiments, feature extractor 108 is configured to identify feature values and form feature vectors for an input document based on the automatically-generated vocabularies. A feature vector may comprise a sequence of values, with each value representing a different vocabulary token. For example, vocabulary $[v_1, v_2, v_3]$ includes three vocabulary tokens, $v_1$, $v_2$, and $v_3$. Feature extractor 108 may use the vocabulary to generate feature vector $[f_1, f_2, f_3]$ for an input document, where $f_1$ corresponds to $v_1$, $f_2$ corresponds to $v_2$, and $f_3$ corresponds to $v_3$. Feature extractor 108 may assign values to each element of the feature vector based on whether the corresponding token occurs in the electronic document. Examples are described in further detail below. In the above example, the feature vector is equal in length to the vocabulary. In other embodiments, feature extractor 108 may append other features to the feature vector. For instance, the feature vector may be represented as $[f_1, f_2, f_3, f_4]$, where $f_4$ is a non-vocabulary feature. Example non-vocabulary features may include, but are not limited to, the number of words in an electronic document, the target recipient(s) for the electronic document, the number of images in an electronic document, the runtime of a video included in the electronic document, and/or other attributes associated with the electronic document. Thus, the length of the feature vector may vary from implementation to implementation.

ML engine 110 is configured to automatically learn, from a training dataset, patterns leading to particular outcomes and to output predicted outcomes for new examples. ML engine 110 includes training logic 112 for training ML models, estimation logic 114 for estimating unknown labels for new examples, and tuning logic 116 for optimizing the parameters of ML models. Techniques for training ML models, outputting estimates, and tuning model parameters are described in further detail in the sections below.

Frontend interface 118 manages interactions between ML application 104 and clients 102a-b. For example, a client may submit requests to perform various functions and view results through frontend interface 118. A client in this context may be a human user, such as a system administrator, or another application, such as a shell or client application.

In some embodiments, frontend interface 118 is a presentation tier in a multitier application. Frontend interface 118 may process requests received from clients, such as clients 102a-b, and translate results from other application tiers into a format that may be understood or processed by the clients. Frontend interface 118 may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, action interface 120 provides an interface for executing actions using computing resources, such as external resources 124a-b. Action interface 120 may include an API, CLI, or other interface for invoking functions to execute actions. One or more of these functions may be provided through cloud services or other applications, which may be external to ML application 104. For example, one or more components of system 100 may invoke an API of an email client application to transmit a targeted email message to a list of recipients. As another example, an API of a publishing tool may be invoked to trigger a targeted social media post to one or more social media platforms for a list of social media users. In yet another example, action interface 120 may submit commands to reconfigure software and/or hardware resources on a given list. Thus, the actions that are performed may vary from implementation to implementation.

In some embodiments, actions may be automatically triggered based on outputs received from ML engine 110. For example, action interface 120 may trigger an action for a given list of recipients if and only if the estimated label satisfies a particular threshold. In the context of campaign analytics, for instance, action interface 120 may publish a targeted campaign message to a given list of recipients if and only if the estimated click-through rate exceeds a threshold. As another example, action interface 120 may push a patch set update (PSU) on a given set of software deployments if and only if the estimated failure rate is lower than a threshold. Additionally or alternatively, other actions may also be triggered depending on the particular implementation. Additionally or alternatively, actions may be triggered responsive to client requests received through frontend interface 118.

In some embodiments, external resources 124a-b are network services that are external to ML application 104. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources 124a-b. Action interface 120 may process and translate inbound requests to allow for further processing by other components of ML engine 110. Action interface 120 may store, negotiate, and/or otherwise manage authentication information for accessing external resources 124a-b. Example authentication information may include, but is not limited to, digital certificates, cryptographic keys, usernames, and passwords. Action interface 120 may include authentication information in the requests to invoke functions provided through external resources 124a-b.

In some embodiments, ML application 104 is a cloud service, such as a software-as-a-service (SaaS) or a web service. Clients, such as clients 102a-b, may be a web browser, mobile application, or other software application communicatively coupled to a network. A client may interact with cloud services using one or more communication protocols, such as HTTP and/or other communication protocols of the Internet Protocol (IP) suite. In other embodiments, ML application 104 may be locally accessible to a user, such as a desktop or other standalone application.

In some embodiments, data repository 122 stores data generated and/or otherwise accessed by components of ML application 104. Example data may include, but is not limited to, trained ML models, generated vocabularies, feature vectors, GUI data, and electronic documents. Data repository 122 may be any type of storage unit and/or device (e.g., a file system, database, collection of tables, or any other storage mechanism) for storing data. Further, data repository 122 may include multiple different storage units and/or devices. The multiple different storage units and/or devices may or may not be of the same type or located at the same physical site. Further, data repository 122 may be implemented or may execute on the same computing system as one or more other components of system 100. Alternatively or additionally, data repository 122 may be implemented or executed on a computing system separate from one or more other components of system 100. Data repository 122 may be communicatively coupled to one or more components illustrated in system 100 via a direct connection or via a network.

Additional embodiments and/or examples relating to computer networks and microservice applications are described below in Section 5.0, titled "Computer Networks and Cloud Networks" and Section 6.0, titled "Microservice Applications".

3.0 GENERALIZED VOCABULARIES FOR DOCUMENT PROCESSING 3.1 Vocabulary Construction for Varying Content Types A vocabulary may include tokens for textual content, non-textual content, or a combination thereof. In some embodiments, a vocabulary token is a data object that uniquely identifies content. For example, a textual token may be an alphanumeric string value of a corresponding word (unigram) or phrase (n-gram) extracted from one or more webpages, social media posts, emails, and/or other electronic documents. In other examples, the token may be a shortened prefix of the word or phrase or a hash value generated by applying a hash function to the word or phrase that is mapped to the word or phrase. Other encodings may also be used, depending on the particular implementation.

The manner in which tokens are generated for non-textual media content may also vary depending on the particular implementation. In some embodiments, a token for non-textual content may be generated based on content metadata that uniquely identifies the content. For example, a token may be a name, size, and/or other attributes extracted from image or video metadata. In other embodiments, the token may be generated as a function of the media content itself. For example, a token may be a hash value generated by applying a hash function to a video or image file or a compressed version of the image or video file. As another example, a hyperlink token may include a uniform resource locator (URL) or another value that is mapped to the URL.

In the examples above, tokens are unique to a corresponding media item, such as an image or video, thereby establishing a one-to-one relationship between the token and the content item. In other embodiments, a vocabulary token may uniquely identify a media classifier. A classifier in this context may be a category or other attribute that may represent one or more media items. For instance, a vocabulary token may be mapped to an image, video, or hyperlink category. The category may be determined based on metadata, such as image tags or captions, user-provided labels, and/or image analysis. As an example, an image token may be mapped to a classification of images including dogs, where the category is determined based on common tags or image classifiers assigned to images in a corpus of electronic documents. In this case, the token may have a one-to-one relationship with a category and a one-to-many relationship with content items. Stated another way, the token may map to different content, such as images of different scenes, if the content shares the same classification represented by the token.

Vocabularies may include tokens for a single content type or tokens for multiple content types. For example, separate vocabularies may be constructed for images, videos, hyperlinks, and text. Additionally or alternatively, a combined vocabulary may be constructed that has tokens from any combination of content. In some embodiments, the combined vocabulary is generated by concatenating two or more vocabularies together. For example, the set of image tokens in an image vocabulary may be concatenated with video tokens, hyperlink tokens, and/or text tokens.

Additionally or alternatively, vocabularies may include unigrams, n-grams, or a combination. As previously mentioned, an n-gram for textual content may correspond to a sequence of words such as a phrase. An n-gram for non-textual content may correspond to a set of co-occurring media items. The n-gram may represent a particular order or an unordered co-occurrence. For example, if image A co-occurs within an electronic document with image B, a token may represent both images in an ordered or unordered manner. In the former case, if the two images occur in a different order in an electronic document, then a different token may be used. In the latter case, the same token may be used regardless of the order.

Figure 2:
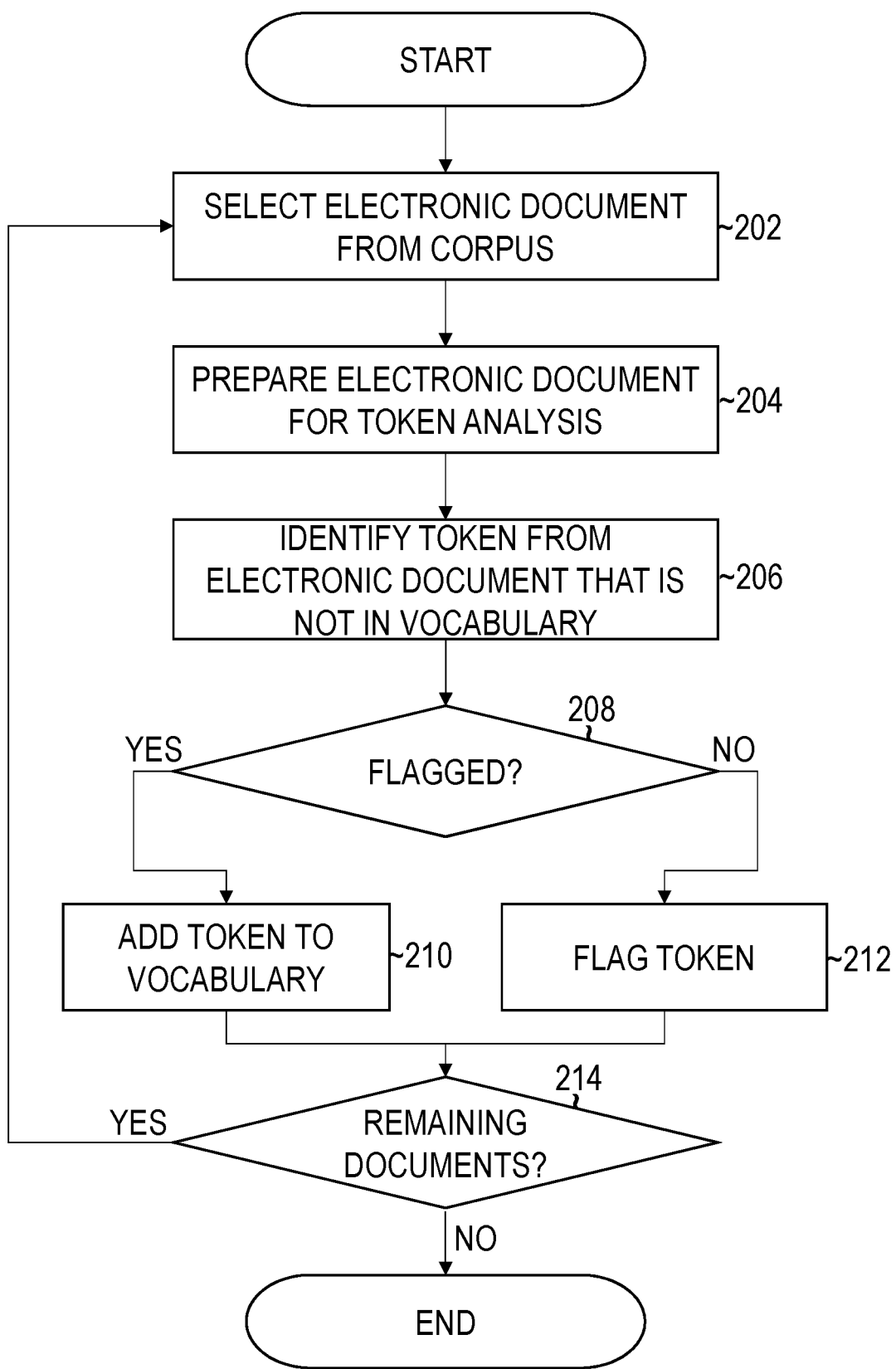
FIG. 2 illustrates an example set of operations for generating a vocabulary in accordance with some embodiments.

FIG. 2 illustrates an example set of operations for generating a vocabulary in accordance with some embodiments. One or more operations illustrated in FIG. 2 may be modified, rearranged, or omitted. Accordingly, the particular sequence of operations illustrated in FIG. 2 should not be construed as limiting the scope of one or more embodiments.

Referring to FIG. 2, the process includes selecting an electronic document from a corpus of documents (operation 202). In some embodiments, the corpus of documents is the same set of documents used by training logic 112 to train an ML model. In other embodiments, vocabulary generator 106 may use a different set of documents to construct the vocabulary.

The process further includes preparing the electronic document for token analysis (operation 204). In some embodiments, this operation includes cleaning the document to remove content to prevent certain tokens from being added to a vocabulary. For example, certain textual tokens, such as the articles "a" and "the", may be so common that there may be no benefit to ML application 104 if included in the vocabulary. As another example, the same image token may appear in the letterhead of an electronic document or the signature block of an email, which may provide little meaning to ML application 104. By removing the content, the size of the vocabulary may be reduced, which may help to limit the storage overhead and improve runtime performance of ML application 104.

The process further identifies a token from the electronic document that is not already in the vocabulary (operation 206). For example, identified token may be a textual token, an image token, a video token, or a hyperlink token. The identified token may be a unigram or an n-gram.

In some embodiments, the process may be configured to search for tokens matching certain criteria. For example, the process may be configured to search for only for tokens of a particular content type, such as only for non-textual tokens or image tokens. As another example, the process may be configured to search for only unigrams or only for n-grams. Other combinations of criteria may be specified to control vocabulary construction and limit the scope of the vocabulary. The criteria may be specified by a user, predefined, or determined during runtime, depending on the particular implementation.

The process further includes determining whether the identified token was previously flagged (operation 208). In some embodiments, tokens are only added to the vocabulary if the tokens occur in a threshold number of electronic documents. Tokens that occur in only one electronic document may not convey much meaning to ML application 104. Therefore, a default of two or more may be used; however, the threshold may be configurable by a use and otherwise vary depending on the particular implementation.

If the token has been flagged indicating that it has not already occurred in another previously processed electronic document, then the process adds the token to the vocabulary (operation 210). Otherwise, the process flags the token (operation 212). In other embodiments, any token that is identified may be added to the vocabulary. Thus, operations 208 and 212 may be omitted.

The process further determines whether there are any remaining documents in the corpus of documents (operation 214). If so, then the process iterates through operations 202-214 for the remaining documents.

Once the process in FIG. 2 is complete, the result is a vocabulary of tokens extracted from the corpus of documents. In some embodiments, the process may be repeated using different parameters to construct different vocabularies. For example, the process may be repeated to construct separate text vocabularies, image vocabularies, video vocabularies, and/or hyperlink vocabularies. It may be useful to have separate vocabularies to run independent analytics for varying content types. In other embodiments, tokens for different content types may be added to the same vocabulary.

3.2 Vocabulary Token Weighting

In some embodiments, vocabulary tokens are assigned weights. The weight of a token may indicate the relevance of the token to ML application 104.

In some embodiments, token weights are assigned in a manner that is inversely related to the occurrence frequency within the corpus of documents used to construct the vocabulary. Text, image, video, and/or hyperlink tokens that frequently occur across different documents may have limited meaning for ML application 104. For example, an image that occurs in all documents in the training corpus may not be useful for a classification model. To provide a measure of how much meaning a token provides, the weight may be lower the more frequently the token occurs across documents.

In some embodiments, a textual and/or non-textual tokens may be assigned a weight using an inverse document frequency formulation. For example, the weight may be assigned as follows:

$$w_i(v_i \in V, D) = \log \frac{N}{1 + |\{d \in D : v_i \in d\}|}$$

where D is the corpus of documents used to construct the vocabulary V, N is the total number of documents in the corpus D, and $|\{d \in D: v_i \in d\}|$ is the number of documents in the corpus D that include at least one occurrence of vocabulary token $v_i$.

3.3 Vocabulary-Based Representations of Documents

Vocabularies may be used to generate feature vector representations of documents. In the example previously given, for instance, vocabulary $[v_1, v_2, v_3]$ includes three vocabulary tokens, $v_1$, $v_2$, and $v_3$. Feature extractor 108 may use the vocabulary to generate feature vector $[f_1, f_2, f_3]$ for an input document, where $f_1$ corresponds to $v_1$, $f_2$ corresponds to $v_2$, and $f_3$ corresponds to $v_3$. Feature extractor 108 may assign values to each element of the feature vector based on whether the corresponding token occurs in the electronic document.

Figure 3:
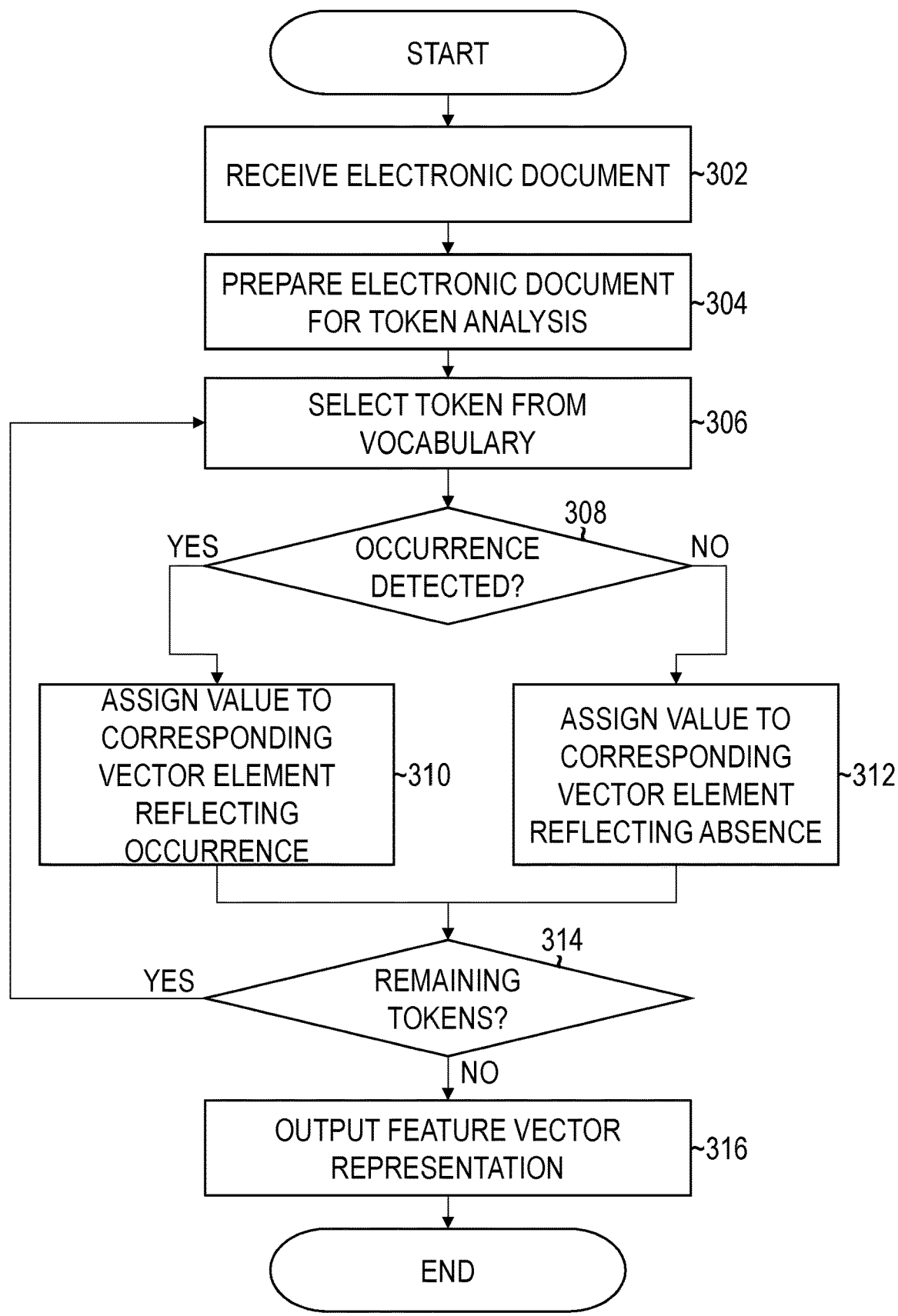
FIG. 3 illustrates an example set of operations for generating a feature vector for a document based on a vocabulary in accordance with some embodiments.

FIG. 3 illustrates an example set of operations for generating a feature vector for a document based on a vocabulary in accordance with some embodiments. One or more operations illustrated in FIG. 3 may be modified, rearranged, or omitted. Accordingly, the particular sequence of operations illustrated in FIG. 3 should not be construed as limiting the scope of one or more embodiments.

Referring to FIG. 3, the process includes receiving an electronic document as input (operation 302). The electronic document may be part of a corpus of documents used to train the ML model or may be separate from the corpus.

The process next prepares the electronic document for token analysis (operation 304). In some embodiments, the process uses the same techniques to prepare the electronic document as are used in operation 204 in the set of operations depicted in FIG. 2. For example, the process may remove common text, images, and/or other content from the electronic document.

The process further includes selecting a token from the vocabulary (operation 306). For example, in the three-token vocabulary $[v_1, v_2, v_3]$, the process may select the first token in the list, $v_1$, to begin the analysis. It is noted that the number of tokens in a vocabulary may vary depending on the particular implementation.

The process further includes searching for occurrences of the token in the electronic document (operation 308). For example, the process may parse and tokenize textual content in the electronic document and compare the tokenized text to the vocabulary tokens to determine whether any matches occur. As another example, the process may generate tokens for image and/or video metadata in the electronic documents and compare the tokens with the vocabulary tokens to detect matches. In yet another example, the process may apply hash functions to content items to generate the tokens and compare the hash values to the vocabulary tokens.

If a match is detected, then the process assigns a value to the corresponding vector element to reflect occurrence of the vocabulary token (operation 310). Otherwise, if no match is detected, then the process assigns a value to the corresponding vector element to reflect the absence of the token (operation 312). The value that is assigned may vary depending on the particular implementation. In some embodiments, the value may be binary in nature to reflect that the token either occurred or did not. For example, if $v_1$ is detected in an electronic document, then a value of 1 may be assigned, otherwise a value of 0, may be assigned.

In other embodiments, the value may reflect a count or frequency with which the token occurred in the document. For example, a token occurring two times may be assigned a value of 2, a token occurring three times a value of 3, etc.

Additionally or alternatively, the vocabulary weightings previously described may be applied to compute the feature value. For example, if $v_1$ has a weight of 0.2, and the token occurs 2 times in the electronic document, then a value of 0.2×2=0.4 may be assigned. In this example, the occurrence frequency in the document itself increases the weight of the feature value, but the occurrence frequency in documents used to construct the vocabulary decreases the weight. Thus, the feature weight for a respective token may be inversely related to the frequency of the respective token in the plurality of documents.

The process further determines whether there are any remaining tokens to analyze (operation 314). If so, then the process iterates through the tokens in the vocabulary and assigns a feature value to a corresponding vector element.

The process further outputs the feature representation (operation 316). The result is a v-long vector where v represents the number of tokens in the vocabulary. For example, an electronic document may have a feature vector representation [0.2, 0, 0.6] based on the three-token vocabulary $[v_1, v_2, v_3]$ based on the occurrence frequency and weights of each of the three tokens within the document.

4.0 MACHINE-LEARNING OPTIMIZATIONS AND APPLICATIONS

4.1 Process Overview

In some embodiments, the vocabulary-based vector representation of documents are used to train and apply ML models. The vector representations allow ML models to learn vocabulary patterns in electronic documents. A trained ML model may estimate unknown labels for documents based at least in part on the learned vocabulary patterns.

Figure 4:
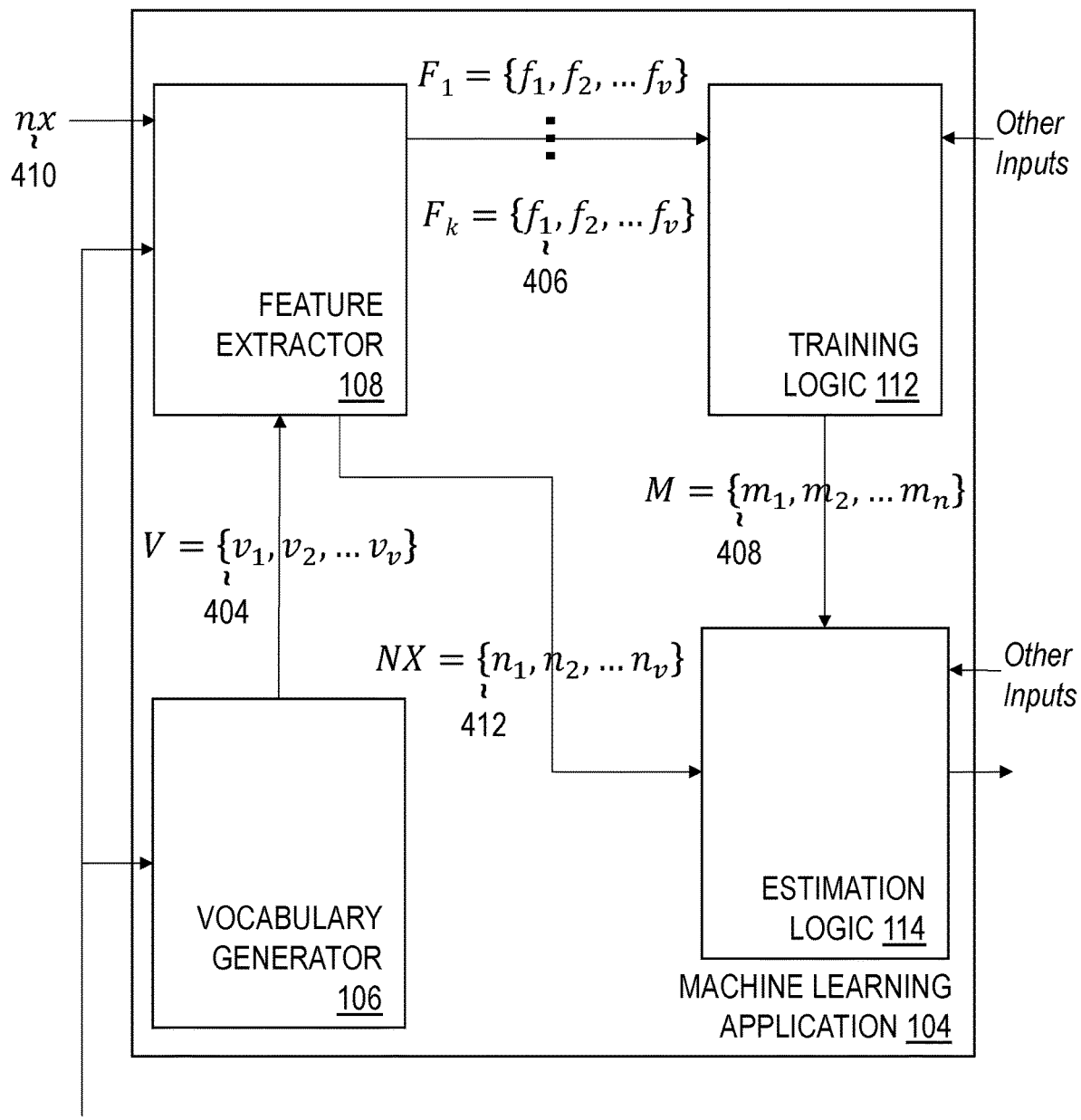
FIG. 4 illustrates an example dataflow for training and applying machine-learning models in accordance with some embodiments.

FIG. 4 illustrates an example dataflow for training and applying machine-learning models in accordance with some embodiments. The dataflow include feeding, as input to vocabulary generator 106 and feature extractor 108, training corpus 402, which is denoted D and includes k documents $\{d_1, d_2, \ldots d_k\}$.

Vocabulary generator 106 may execute the process depicted in FIG. 2 to construct vocabulary 404, which is denoted V and includes v tokens $\{v_1, v_2, \ldots v_v\}$. Although only one vocabulary is shown, in other embodiments, vocabulary generator 106 may generate separate vocabularies for different content types or groups of content types as previously described. For example, vocabulary generator 106 may generate a vocabulary of textual tokens, image tokens, video tokens, hyperlink tokens and/or any combination thereof.

Feature extractor 108 may execute the process depicted in FIG. 3 on training corpus 402 using vocabulary 404 to generate a set of k v-long feature vectors 406, denoted $F_1$ to $F_k$. Each vector represents a different document within training corpus 402. Each vector representation may include values corresponding to v tokens in vocabulary 404 and be assigned values based on the occurrence in the document being represented by the vector.

Training logic 112 receives the set of feature vectors 406 as input. In some embodiments, training logic 112 may further receive other inputs, such as model parameters, document labels, and/or other feature values. As previously described, vocabulary feature vectors may be combined with other features. The result may be a composite ML training vector used to train one or more ML models. Techniques for training ML models are described further below. The output of training logic 112 is a trained ML model 408, denoted M and including ML artifacts $\{m_1, m_2, \ldots m_n\}$. An ML artifact may vary depending on the ML model. Examples may include, without limitations, weighted connections between neurons inside of an artificial neural network, support vector machine weights, decision tree parameters, and/or other model components for estimating a label as a function of an input ML feature vector.

During an evaluation phase, new document 410, denoted nx, is fed as input to feature extractor 108. Feature extractor 108 then generates v-long feature vector 412, denoted NX and including feature values $\{n_1, n_2, \ldots n_v\}$, using vocabulary 404. Feature vector 412 is fed as input to estimation logic 114. Estimation logic 114 also receives other inputs such as additional feature values and/or model configuration settings. It is noted that the other inputs fed to estimation logic 114 do not include document labels for new document 410 since the label is unknown. Estimation logic 114 applies ML model 408 to estimate a label for new document 410. The estimated label may be used by machine learning application 104 to execute one or more automated actions as described further below.

4.2 Model Training Based on Generalized Vocabularies

Figure 5:
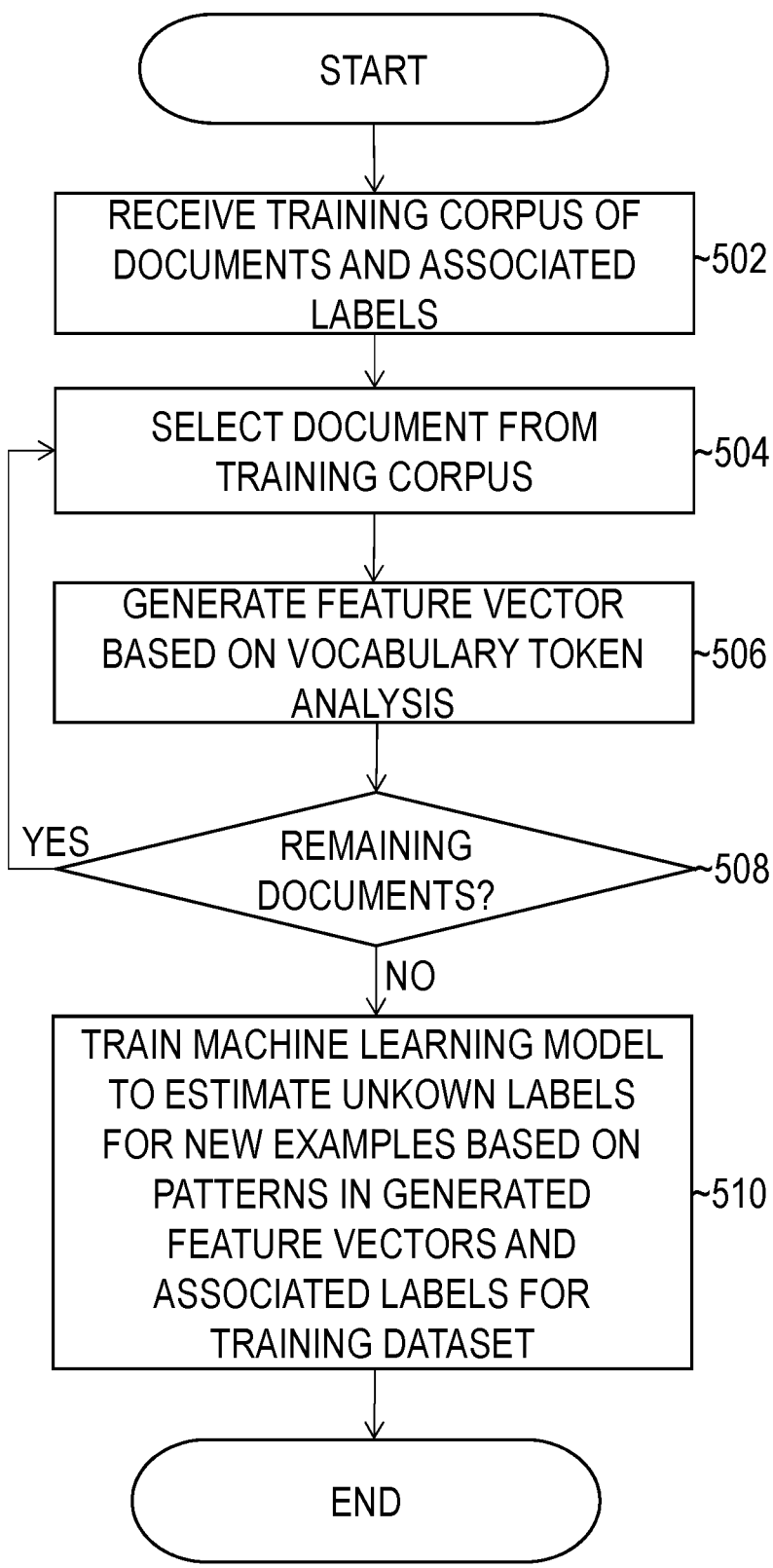
FIG. 5 illustrates an example set of operations for training a machine-learning model in accordance with some embodiments.

FIG. 5 illustrates an example set of operations for training a machine-learning model in accordance with some embodiments. One or more operations illustrated in FIG. 5 may be modified, rearranged, or omitted. Accordingly, the particular sequence of operations illustrated in FIG. 5 should not be construed as limiting the scope of one or more embodiments.

The training process includes receiving a training corpus of documents and associated labels (operation 502). A label in this context refers to a classification or metric associated with an electronic document. For instance, a label may identify the click-through rate for a hyperlink included in the electronic document or a sentiment classification for viewers of the document. Other classifiers and/or metrics may also be assigned depending on the particular implementation. A user may manually assign labels to the documents or the labels may be automatically assigned based on metrics and/or other attributes associated with the electronic documents. For instance, a user may assign a sentiment to a Tweet or a sentiment classifier may automatically assign the sentiment based on the like to dislike ratio, retweets, engagement, response patterns, and/or other metrics.

The training process next selects a document from the training corpus (operation 504). The process may select and iterate through the documents in any arbitrary or predetermined order.

The training process includes generating a respective feature vector for the selected document (operation 506). The feature vector may be based on the occurrence of text, image, video, and/or hyperlink vocabulary tokens in the document as previously described. The result of this operation may be a v-long feature vector where v is the number of tokens in the vocabulary. In other embodiments, the ML feature vector may include additional features as previously described, such as values for other document attributes. In these cases, the ML feature vector may be greater in length than v.

The training process further includes determining whether there are remaining documents in the training corpus of documents (operation 508). If so, then the process returns to operation 504 and iterates through the remaining documents to generate a respective feature vector for each remaining document.

The training process next trains a ML model to estimate unknown labels for new examples based on patterns in feature vectors and the associated labels in the training corpus (operation 510). For example, the ML model may be trained to estimate a click-through rate, success rate, failure rate, or any other relevant metric or classification based, at least in part, on learned patterns of textual, image, video, and/or hyperlink vocabulary tokens.

Training logic 112 may train one or more ML models using the feature vectors. Example models that may be trained may include, but are not limited to, regression-based models, random forest walkthroughs, artificial neural networks, and support vector machines. The model training may determine what weights, if any, to give to features and/or combinations of features based on patterns learned through the training feature vectors and associated labels.

4.3 Model Predictions Using Generalized Vocabularies

Once trained, a ML model may be used to estimate unknown labels for new examples. For example, the outcome of a given action may be predicted or a new document classification may be automatically estimated based on the feature values for a new document, even though the specific combination of feature values and corresponding outcome has not been previously observed. As an example, a client may request a prediction of the sentiment of a new Tweet for different audiences. In this case, the new Tweet may include a particular combination of words, images, videos, and/or hyperlinks not previously observed. ML engine 110 may use the trained ML model to predict the sentiment based on the patterns learned from the training corpus of documents.

Figure 6:
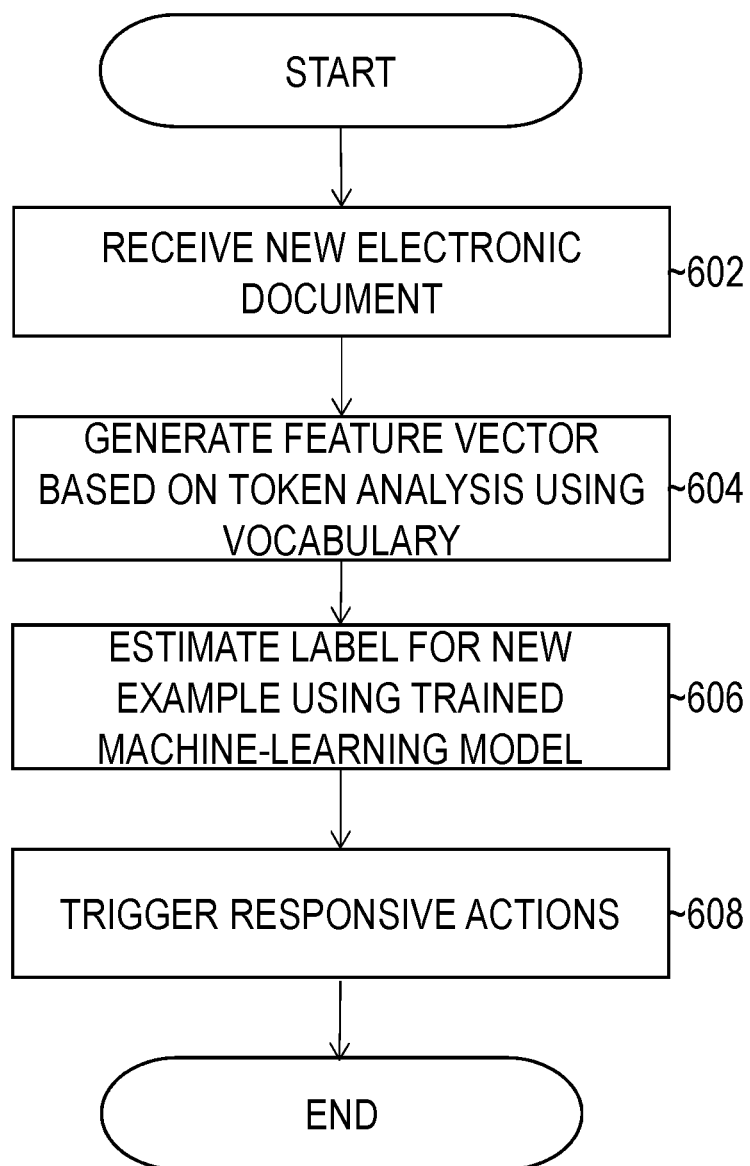
FIG. 6 illustrates an example set of operations for estimating unknown labels for new documents using a trained machine-learning model in accordance with some embodiments.

FIG. 6 illustrates an example set of operations for estimating unknown labels for new examples using a trained machine-learning model in accordance with some embodiments. One or more operations illustrated in FIG. 6 may be modified, rearranged, or omitted. Accordingly, the particular sequence of operations illustrated in FIG. 6 should not be construed as limiting the scope of one or more embodiments.

The estimation process includes receiving a new document for which a label is unknown (operation 602). For example, the new document may be for a potential social media post for which the sentiment among a list of viewers is unknown since it has not yet been posted. As another example, the new document may be a webpage for which a classification is unknown. The ML model may be applied to other types of electronic documents to estimate an unknown label.

The estimation process next generates a feature vector based on a token analysis using the constructed vocabulary (operation 604). For example, the process may generate a feature vector based on the occurrence of text tokens, image tokens, video tokens, and/or hyperlink tokens, as previously described.

The estimation process further includes estimating a label for the new example using the trained ML model (operation 606). In some embodiments, ML engine 110 receives, as input, the feature vector for the new document at this operation and applies the trained model to generate the estimated label. For example, the estimated label may be a predicted metric, such as a predicted click-through rate, or an estimated classification. The labels that are estimated may vary depending on the particular implementation.

The process further includes triggering one or more responsive actions (operation 608). The applied ML model may be used to enhance and/or optimize various computing functions, which may vary depending on the particular ML application.

In some embodiments, ML application 104 may be configured to analyze automated social media posts ML application 104 may apply the model to estimate a predicted sentiment of one or more social media post based on patterns in the textual and/or non-textual tokens. ML application 104 may trigger, via action interface 120, a social media post if the estimated sentiment satisfies a threshold. For instance, if the estimated sentiment is positive within a threshold level of confidence, then an automatic responsive Tweet may be sent. If the estimated sentiment is negative or does not satisfy the threshold level of confidence, then ML application 104 may prevent the social media post from being published.

As another example, ML application 104 may select one of a plurality of social media posts to publish based on which social media post has vocabulary patterns that are predicted with the highest confidence to lead to a positive sentiment or which patterns are predicted to lead to the highest click-through rate for an embedded hyperlink.

In yet another example, ML application 104 may flag a webpage for a violation of guidelines based on the textual and/or non-textual tokens on the webpage. Other actions may be triggered through action interface 120. Examples include, but are not limited to, selecting and rendering GUI objects in a webpage, presenting recommendations, patching software resources, and otherwise reconfiguring computing resources.

4.4 Model Tuning

Figure 7:
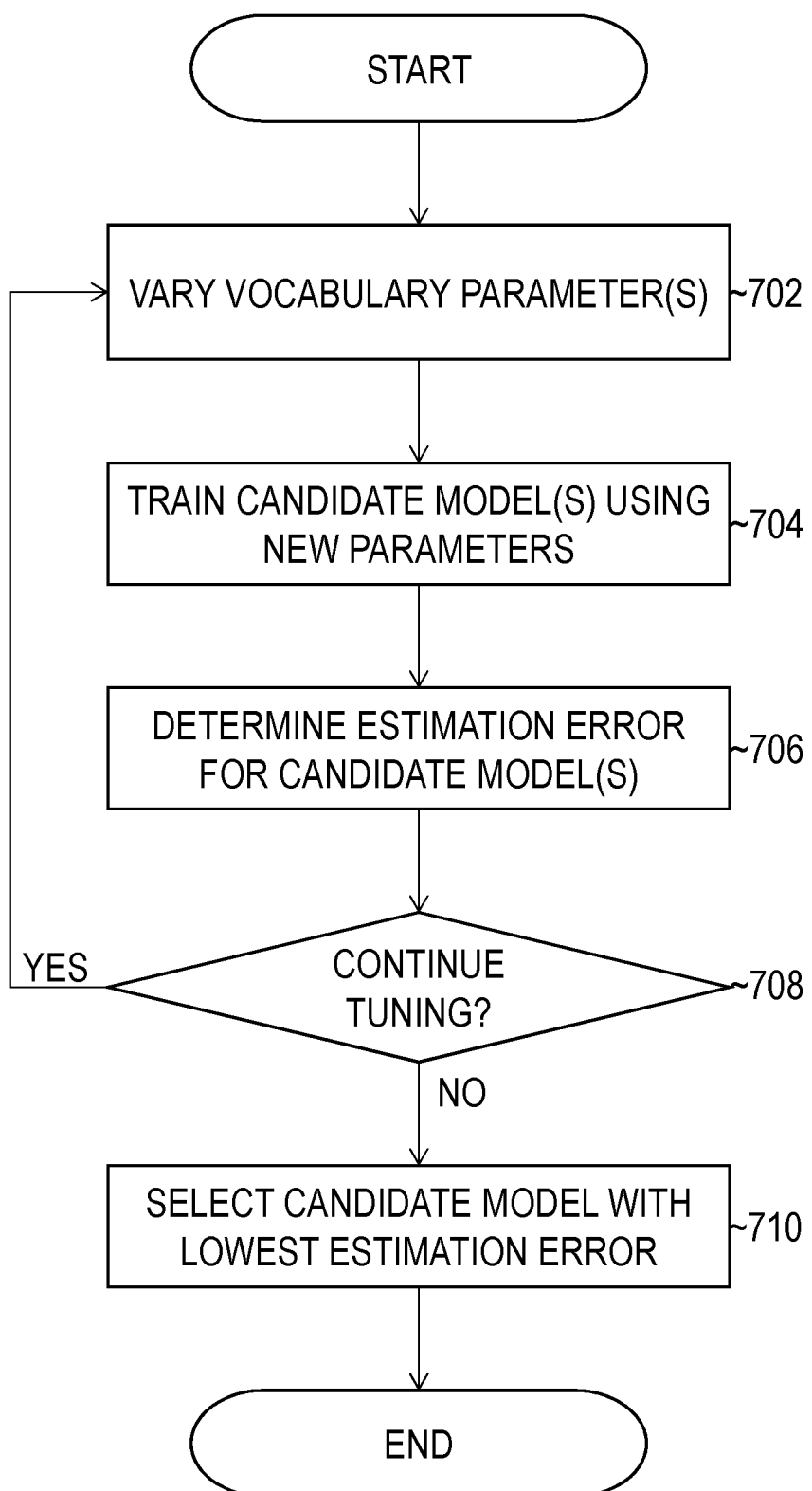
FIG. 7 illustrates an example process for tuning a machine-learning model as a function of estimation error in accordance with some embodiments.

In some embodiments, ML engine 110 may tune the vocabulary parameters to optimize model performance. FIG. 7 illustrates an example process for tuning a ML model as a function of estimation error in accordance with some embodiments. One or more operations illustrated in FIG. 7 may be modified, rearranged, or omitted. Accordingly, the particular sequence of operations illustrated in FIG. 7 should not be construed as limiting the scope of one or more embodiments.

The tuning process includes varying one or more vocabulary parameters (operation 702). In some embodiments, the tokens within a vocabulary may be varied. For example, one vocabulary may include a combined set of tokens for textual and non-textual content, another vocabulary may include only tokens for non-textual content, yet another vocabulary may include only image tokens, etc. As another example, tokens that have a weight below a threshold may be included in one vocabulary and removed from another vocabulary. Thus, the length of the vocabulary may be varied during the tuning process. However, during training and estimation, the vocabulary may remain at a fixed-length.

In addition or as an alternative to varying the vocabulary tokens, the vocabulary weights may be varied. In some embodiments, token weights are varied by content type. For example, non-textual vocabulary tokens may be assigned a greater weight than textual tokens in one instance, equally in another instance, and less in yet another instance. As another example, image tokens may be weighted differently than video tokens and/or hyperlink tokens.

The tuning process next trains one or more candidate models using the new set of parameters (operation 704). During this operation, the process may generate a new set of feature vectors for a training corpus of documents. For example, one iteration may train models using a combined set of tokens, another using only image tokens, another using different weightings, etc. In some embodiments, the same set of feature vectors may be used to train different types of models, such as regression-based models and artificial neural networks, to provide further tuning.

The tuning process further includes determining the estimation error for the candidate models (operation 706). To determine the estimation error, the process may generate estimates for a testing dataset. A testing dataset may include examples that were not used to train the candidate models but for which labels are known. The tuning process may generate a prediction for a respective example in the testing dataset using each candidate model that was trained based on the new parameters and compare it to the respective known labels. The estimation error for an example in a testing dataset may be computed as a function of the difference between the estimated label and the known label. The estimation error for the candidate model may be computed as the average of the estimation error across all examples in the testing dataset.

The tuning process next determines whether to continue tuning (operation 708). For example, the tuning process may iterate through various combinations of vocabularies and/or vocabulary weights. Additionally or alternatively an estimation error threshold may be set where tuning may stop if the estimation error for one or more of the candidate models is below a threshold.

The tuning process next selects the candidate model with the lowest estimation error (operation 710). The selected model may then be used to evaluate new documents according to the new vocabulary parameters. For example, if a vocabulary consisting of only image tokens was determined to yield the lowest estimation error, then the corresponding vocabulary may be used in the estimation process previously described. As another example, the vocabulary weights used for generating the feature vectors may also be updated based on the tuning process. In this manner a more accurate ML model may be generated.

5.0 COMPUTER NETWORKS AND CLOUD NETWORKS

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 MICROSERVICE APPLICATIONS

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 HARDWARE OVERVIEW

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
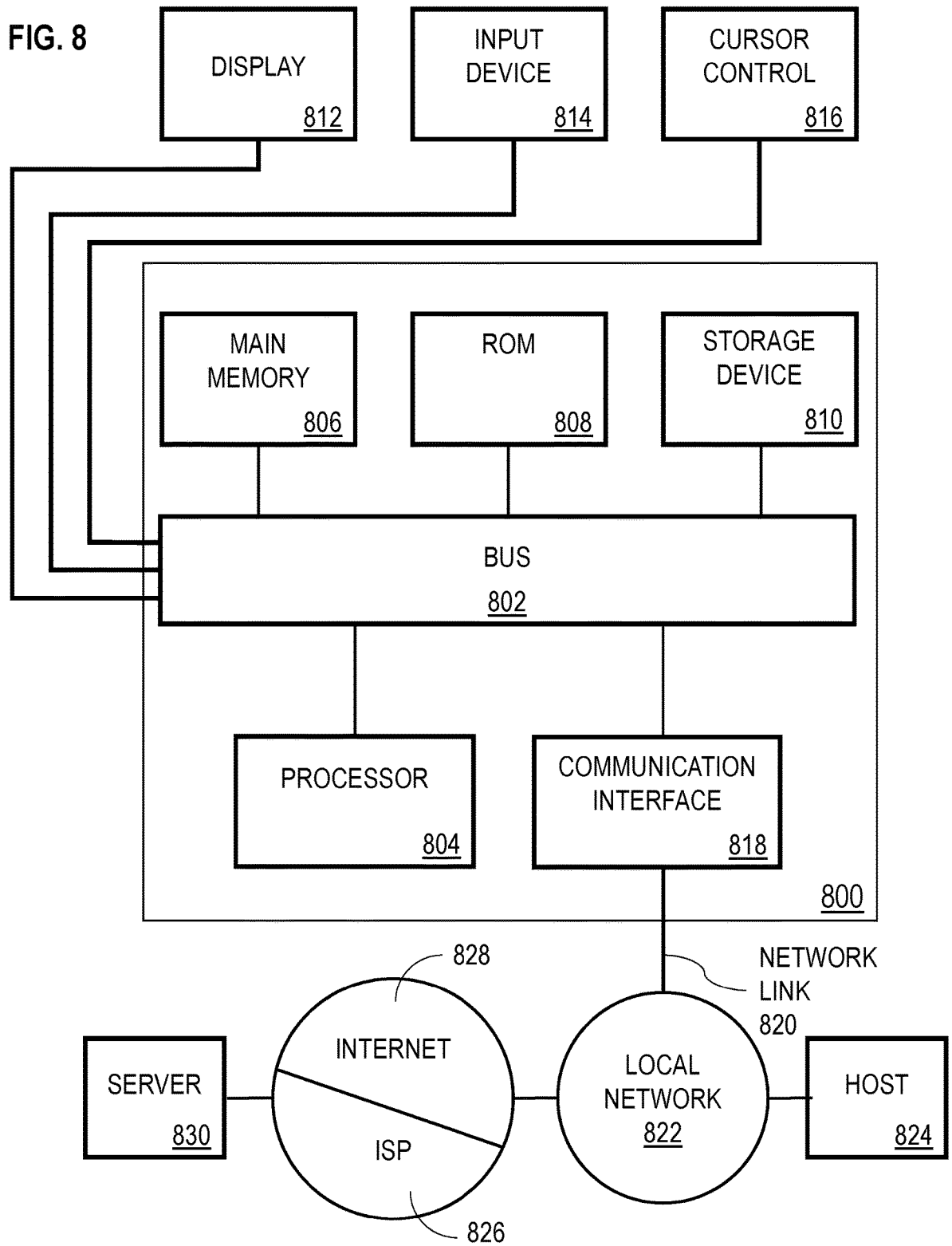
FIG. 8 shows a block diagram that illustrates a computer system in accordance with one or more embodiments.

For example, FIG. 8 is a block diagram that illustrates computer system 800 upon which some embodiments may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 MISCELLANEOUS; EXTENSIONS

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause:
   receiving a plurality of documents that include non-textual content;
   generating a set of one or more tokens for the non-textual content based at least in part on a hash value obtained by applying a hash function to the non-textual content;
   determining whether or not the set of one or more tokens for the non-textual content are included in a vocabulary;
   responsive to determining that at least one token of the set of one or more tokens for the non-textual content is not included in the vocabulary, generating an updated vocabulary by adding the at least one token to the vocabulary;
   training or tuning a machine-learning model based at least in part on the updated vocabulary; and
   estimating, by the machine learning model that is trained or tuned based at least in part on the updated vocabulary, a label for a document.

2. The one or more non-transitory computer-readable media of claim 1, wherein the vocabulary includes at least a first token for non-textual content in the plurality of documents and at least a second token for textual content in the plurality of documents.

3. The one or more non-transitory computer-readable media of claim 1, wherein the set of one or more tokens for the non-textual content is further generated based at least in part on metadata that uniquely identifies the non-textual content.

4. The one or more non-transitory computer-readable media of claim 1, wherein the set of one or more tokens for the non-textual content is further generated based at least in part on a compressed version of the non-textual content.

5. The one or more non-transitory computer-readable media of claim 1, wherein the set of one or more tokens for the non-textual content is further generated based at least in part on a label associated the non-textual content.

6. The one or more non-transitory computer-readable media of claim 5, wherein the label is assigned to the non-textual content by a user.

7. The one or more non-transitory computer-readable media of claim 5, wherein the label is generated by a classifier function that assigns labels based at least in part on an analysis of images in the non-textual content.

8. The one or more non-transitory computer-readable media of claim 1, wherein the non-textual content includes at least one of an image, a video, or a hyperlink.

9. The one or more non-transitory computer-readable media of claim 1, wherein the non-textual content includes at least one of an image, a video, and a hyperlink, wherein the at least one token includes at least (a) an image token corresponding to the image; (b) a video token corresponding to the video; and (c) a hyperlink token corresponding to the hyperlink.

10. The one or more non-transitory computer-readable media of claim 1, wherein at least one token includes a first token that maps to a plurality of non-textual content items that share a same classification.

11. The one or more non-transitory computer-readable media of claim 1, wherein the at least one token includes an n-gram corresponding to a set of co-occurring media items.

12. The one or more non-transitory computer-readable media of claim 1, wherein the updated vocabulary is further generated responsive to determining that the at least one token for the non-textual content occurs within a threshold number of the plurality of documents.

13. The one or more non-transitory computer-readable media of claim 1, wherein the updated vocabulary is further generated responsive to determining that the at least one token has been flagged indicating that the at least one token was previously identified in at least one other document in the plurality of documents.

14. The one or more non-transitory computer-readable media of claim 1, wherein the at least one token includes a first token that is associated with a weight that is determined, based at least in part, on a frequency of the first token in the plurality of documents.

15. The one or more non-transitory computer-readable media of claim 14, wherein the weight for the first token is inversely related to the frequency of the first token in the plurality of documents.

16. The one or more non-transitory computer-readable media of claim 1, wherein training or tuning the machine-learning model based at least in part on the updated vocabulary comprises generating a set of feature vector representations for the plurality of new documents based at least in part on the updated vocabulary and adjusting one or more model parameters using the set of feature vector representations to reduce an estimation error of the function of the machine-learning model.

17. The one or more non-transitory computer-readable media of claim 1, wherein estimating, by the machine learning model that is trained or tuned based at least in part on the updated vocabulary, a label for a document comprises generating a feature vector representation for the new document based at least in part on the updated vocabulary, wherein the label is estimated based at least in part on the feature vector representation.

18. The one or more non-transitory computer-readable media of claim 1, wherein determining whether or not the set of one or more tokens for the non-textual content that is not are included in a vocabulary comprises determining whether or not the hash value is included in the vocabulary.

19. A system comprising:
one or more hardware processors;
one or more non-transitory computer-readable media storing instructions, which when executed by the one or more hardware processors, cause:
receiving a plurality of documents that include non-textual content;
generating a set of one or more tokens for the non-textual content based at least in part on a hash value obtained by applying a hash function to the non-textual content;
determining whether or not the set of one or more tokens for the non-textual content are included in a vocabulary;
responsive to determining that at least one token of the set of one or more tokens for the non-textual content is not included in the vocabulary, generating an updated vocabulary by adding the at least one token to the vocabulary;
training or tuning a machine-learning model based at least in part on the updated vocabulary; and
estimating, by the machine learning model that is trained or tuned based at least in part on the updated vocabulary, a label for a document.

20. A method comprising:
receiving a plurality of documents that include non-textual content;
generating a set of one or more tokens for the non-textual content based at least in part on a hash value obtained by applying a hash function to the non-textual content;
determining whether or not the set of one or more tokens for the non-textual content are included in a vocabulary;
responsive to determining that at least one token of the set of one or more tokens for the non-textual content is not included in the vocabulary, generating an updated vocabulary by adding the at least one token to the vocabulary;
training or tuning a machine-learning model based at least in part on the updated vocabulary; and
estimating, by the machine learning model that is trained or tuned based at least in part on the updated vocabulary, a label for a document.

* * * * *

UNITED STATES PATENT AND TRADEMARK OFFICE
CERTIFICATE OF CORRECTION

| | | |
|---|---|---|
| PATENT NO. | : 11,775,759 B2 | Page 1 of 1 |
| APPLICATION NO. | : 17/888178 | |
| DATED | : October 3, 2023 | |
| INVENTOR(S) | : Kalluri | |

It is certified that error appears in the above-identified patent and that said Letters Patent is hereby corrected as shown below:

In the Drawings

On sheet 5 of 8, in FIG. 5, under Reference Numeral 510, Line 2, delete "UNKOWN" and insert -- UNKNOWN --, therefor.

Signed and Sealed this
Twenty-fifth Day of June, 2024

Katherine Kelly Vidal
*Director of the United States Patent and Trademark Office*